United States Patent
Utoh et al.

(10) Patent No.: US 9,111,209 B2
(45) Date of Patent: Aug. 18, 2015

(54) IMAGE FORMING APPARATUS AND POWER SUPPLY CONTROL SYSTEM

(71) Applicants: Yohsuke Utoh, Kanagawa (JP); Takashi Soyama, Kanagawa (JP); Yuji Ikeda, Kanagawa (JP); Genki Watanabe, Kanagawa (JP)

(72) Inventors: Yohsuke Utoh, Kanagawa (JP); Takashi Soyama, Kanagawa (JP); Yuji Ikeda, Kanagawa (JP); Genki Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/247,660

(22) Filed: Apr. 8, 2014

(65) Prior Publication Data
US 2014/0300921 A1 Oct. 9, 2014

(30) Foreign Application Priority Data
Apr. 9, 2013 (JP) ................................. 2013-081085

(51) Int. Cl.
G06K 15/00 (2006.01)
H04N 1/00 (2006.01)
G03G 15/00 (2006.01)

(52) U.S. Cl.
CPC ........ *G06K 15/4055* (2013.01); *G03G 15/5004* (2013.01); *G03G 15/5075* (2013.01); *H04N 1/00* (2013.01)

(58) Field of Classification Search
USPC .................................. 358/1.14; 713/300, 310
See application file for complete search history.

(56) References Cited

U.S. PATENT DOCUMENTS

| 6,105,138 | A | 8/2000 | Arakawa et al. |
| 7,669,062 | B2 * | 2/2010 | Negishi .......................... 713/300 |
| 2006/0028661 | A1 * | 2/2006 | Uruma ............................. 358/1.6 |
| 2011/0176171 | A1 * | 7/2011 | Hagiuda ....................... 358/1.15 |
| 2013/0215450 | A1 * | 8/2013 | Hatano ........................ 358/1.14 |

FOREIGN PATENT DOCUMENTS

| JP | 09-212261 | 8/1997 |
| JP | 2007-320051 | 12/2007 |
| JP | 2010-147809 | 7/2010 |

* cited by examiner

*Primary Examiner* — Benjamin O Dulaney
(74) *Attorney, Agent, or Firm* — Duft Bornsen & Fettig LLP

(57) ABSTRACT

An image forming apparatus includes a reception part that receives, from a request part connected via a network, a power supply stop request that designates at least one of a plurality of power supply stop modes for stopping power supply in the image forming apparatus; a selection part that selects, when stopping the power supply in the image forming apparatus is not allowed in the designated power supply stop mode, power supply stop modes from the plurality of power supply stop modes in each of which stopping the power supply in the image forming apparatus is allowed; and a notification part that notifies the request part of the power supply stop mode selected by the selection part.

8 Claims, 7 Drawing Sheets

IMAGE FORMING APPARATUS AND POWER SUPPLY CONTROL SYSTEM

BACKGROUND OF THE INVENTION

1. Field of the Invention

The present invention relates to an image forming apparatus and a power supply control system.

2. Description of the Related Art

A technology is known in which the power supply in an information processing apparatus is controlled remotely.

Patent Reference No. 1 (Japanese Laid-Open Patent Application No. 9-212261) discloses an information processing apparatus that stops the power supply therein in response to an instruction from a remote terminal apparatus after stopping execution of application software that was currently being executed. Patent Reference No. 2 (Japanese Laid-Open Patent Application No. 2007-320051) discloses an image forming apparatus that controls power supply according to a power supply operation instruction by a remote operation after executing all jobs in a case where there are jobs that are currently being executed at a time of receiving the power supply operation instruction.

SUMMARY OF THE INVENTION

According to one aspect of the present invention, an image forming apparatus includes a reception part that receives, from a request part connected via a network, a power supply stop request that designates at least one power supply stop mode of a plurality of power supply stop modes for stopping the power supply in the image forming apparatus; a selection part that selects, when stopping the power supply in the image forming apparatus is not allowed in the designated at least one power supply stop mode, one or more power supply stop modes in each of which stopping the power supply in the image forming apparatus is allowed from the plurality of power supply stop modes; and a notification part that notifies the request part of the one or more power supply stop modes selected by the selection part.

Other objects, features and advantages of the present invention will become more apparent from the following detailed description when read in conjunction with the accompanying drawings.

DETAILED DESCRIPTION OF THE EMBODIMENTS

Below, using the drawings, the embodiments of the present invention will be described in detail.

For the sake of convenience, a problem to be solved by the embodiments will be described first.

According to the technologies disclosed by Patent References Nos. 1 and 2 mentioned above, it may be impossible to select a suitable method of stopping the power supply according to a user's request remotely and stop the power supply in the selected method.

An objective of the embodiments of the present invention is to provide an image forming apparatus by which it is possible to select a suitable method of stopping the power supply according to a user's request remotely and stop the power supply in the selected method.

Below, the embodiments of the present invention will be described using the accompanying drawings.

<System Configuration>

Figure 1:
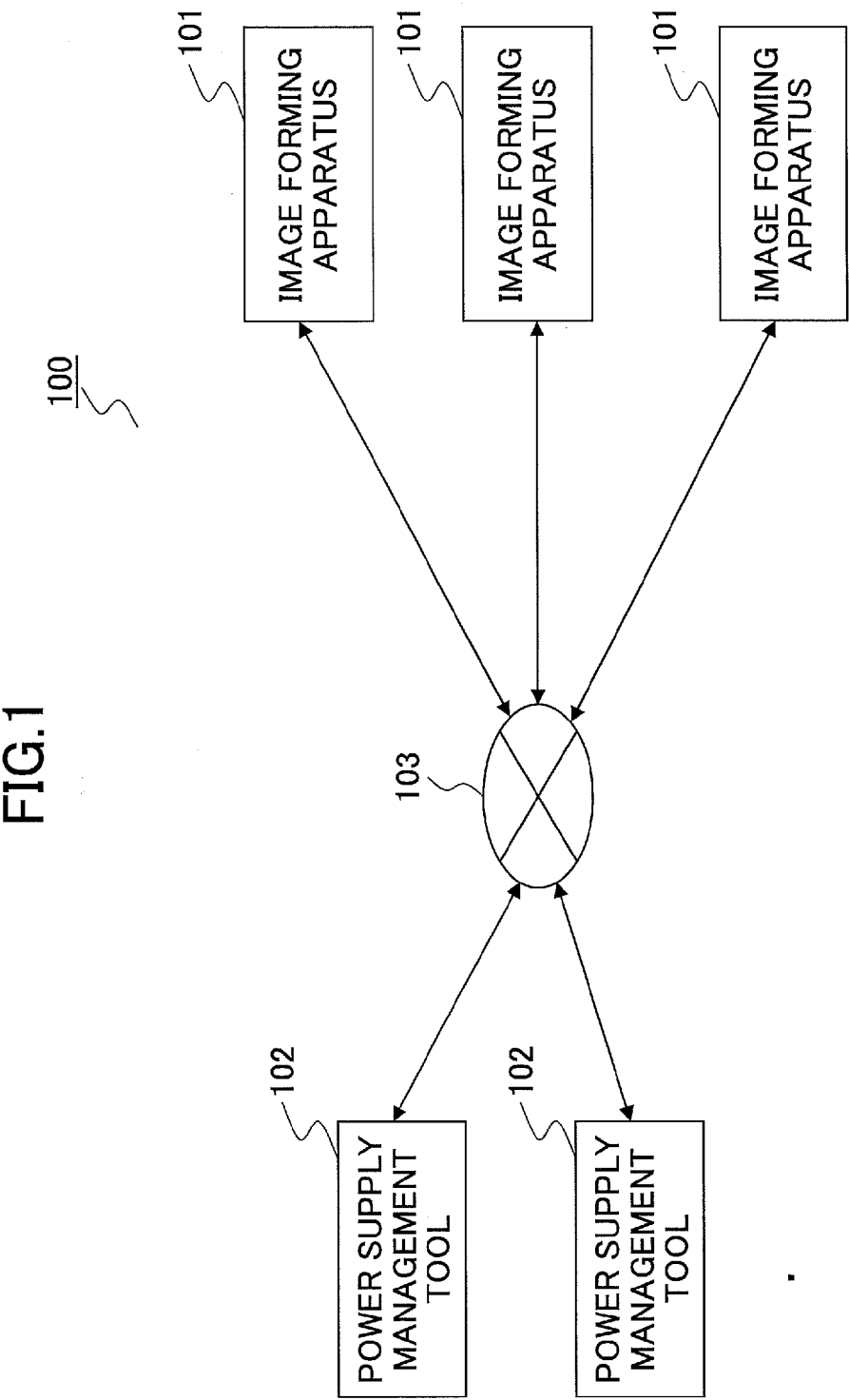
FIG. 1 shows a general configuration of a power supply control system according to first and second embodiments of the present invention.

FIG. 1 shows a general configuration of a power supply control system 100 according to the first and second embodiments. The power supply control system 100 includes a plurality of image forming apparatuses 101 connected to a network 103; and one or a plurality of power supply management tools 102 connected with the image forming apparatuses 101 via the network 103. Note that the specific number of image forming apparatuses 101 and the specific number of the power supply management tools 102 in FIG. 1 are one example, and can be any other numbers.

Specific examples of the image forming apparatuses 101 can include, for example, MultiFunction Peripherals (MFPs) each having respective functions of a printer, a copier, a facsimile machine, a scanner and so forth, various sorts of information processing apparatuses having functions of forming images such as printers, copiers, facsimile machines, scanners and so forth.

The power supply management tool 102 is a tool for controlling the power supply in the image forming apparatus 101 via the network 103 remotely or the like. For example, the power supply management tool 102 is an information processing apparatus such as a personal computer, software that operates in an information processing apparatus, or the like. Further, the power supply management tool 102 can be a dedicated terminal apparatus.

The image forming apparatus 101 has information unique to the image forming apparatus such as an apparatus ID or an apparatus name. An administrator or a user of the predetermined image forming apparatus 101 can control the power supply in the predetermined image forming apparatuses 101 based on the unique information.

<Hardware Configuration>

Figure 2:
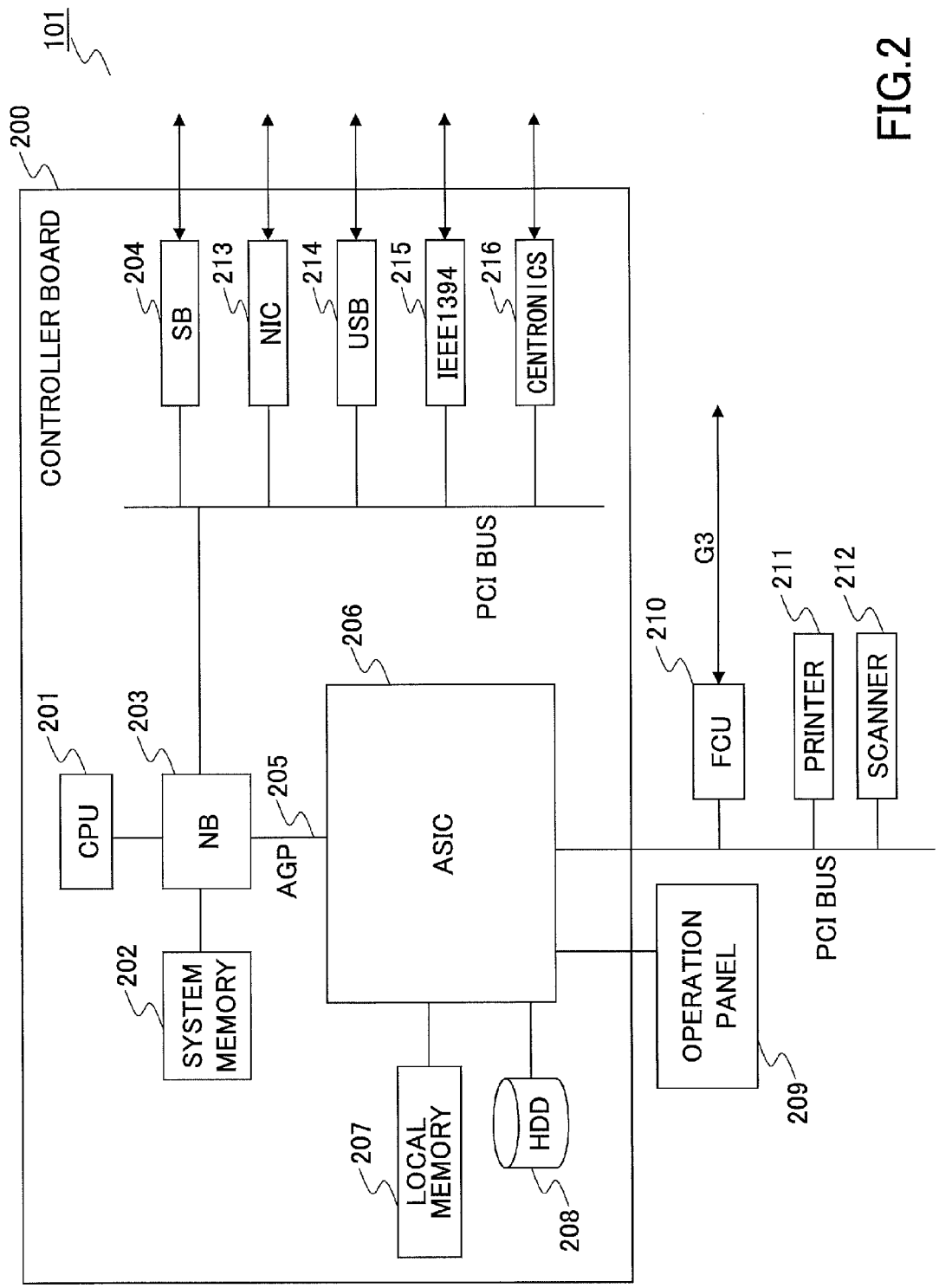
FIG. 2 shows a hardware configuration of an image forming apparatus according to the first and second embodiments of the present invention.

FIG. 2 shows a hardware configuration of the image forming apparatus 101 according to the first and second embodiments. The image forming apparatus 101 includes a controller board 200, an operation panel 209, a Facsimile Control Unit (FCU) 210, a printer 211 and a scanner 212.

The controller board 200 includes a Central Processing Unit (CPU) 201, an Application Specific Integrated Circuit (ASIC) 206, a Hard Disk Drive (HDD) 208, a system memory 202, a local memory 207, a North Bridge (NB) 203, a South Bridge (SB) 204, a Network Interface Card (NIC) 213, a USB interface 214, an IEEE1394 interface 215 and a centronics interface 216.

The operation panel 209 is connected with the ASIC 206 in the controller board 200. The SB 204, the NIC 213, the USB interface 214, the IEEE 1394 interface 215 and the centronics interface 216 are connected with the NB 203 by a PCI bus. Further, the FCU 210, the printer 211 and the scanner 212 are connected with the ASIC 206 in the controller board 200 by a PCI bus.

In the controller board 200, the local memory 207, the HDD 208 and so forth are connected with the ASIC 206, and also, the CPU 201 and the ASIC 206 are connected via the NB 203 of a chipset of the CPU 201. By thus connecting the CPU 201 and the ASIC 206 via the NB 203, it is possible to be compatible in a case where an interface of the CPU 201 is not accessible.

Further, the ASIC 206 and the NB 203 are connected not by a PCI bus but by an Accelerated Graphic Port (AGP) 205.

The CPU 201 is a processor that carries out overall control of the image forming apparatus 100. The CPU 201 executes programs such as an operating system, applications, various services and so forth stored in the HDD 208 or the like and carries out respective functions of the image forming apparatus 101.

The NB 203 is a bridge for connecting the CPU 201, the system memory 202, the SB 204 and the ASIC 206. The system memory 202 is used as a memory for drawing or rendering in the image forming apparatus 101. The SB 204 is a bridge for connecting the NB 203 with a PCI bus and a peripheral device. Further, the local memory 207 is used as a buffer for images to be copied and as a code buffer. The system memory 202 or the local memory 207 may be simply referred to as a "memory" or a "storage area", hereinafter.

The ASIC 206 is an IC that is for the purpose of image processing and has a hardware element for image processing. The HDD 208 is a storage for storing images, programs, font data, forms, and so forth. The operation panel 209 is an operation part that receives input operations from a user and presents a display to the user.

<Functional Configuration>

Figure 3:
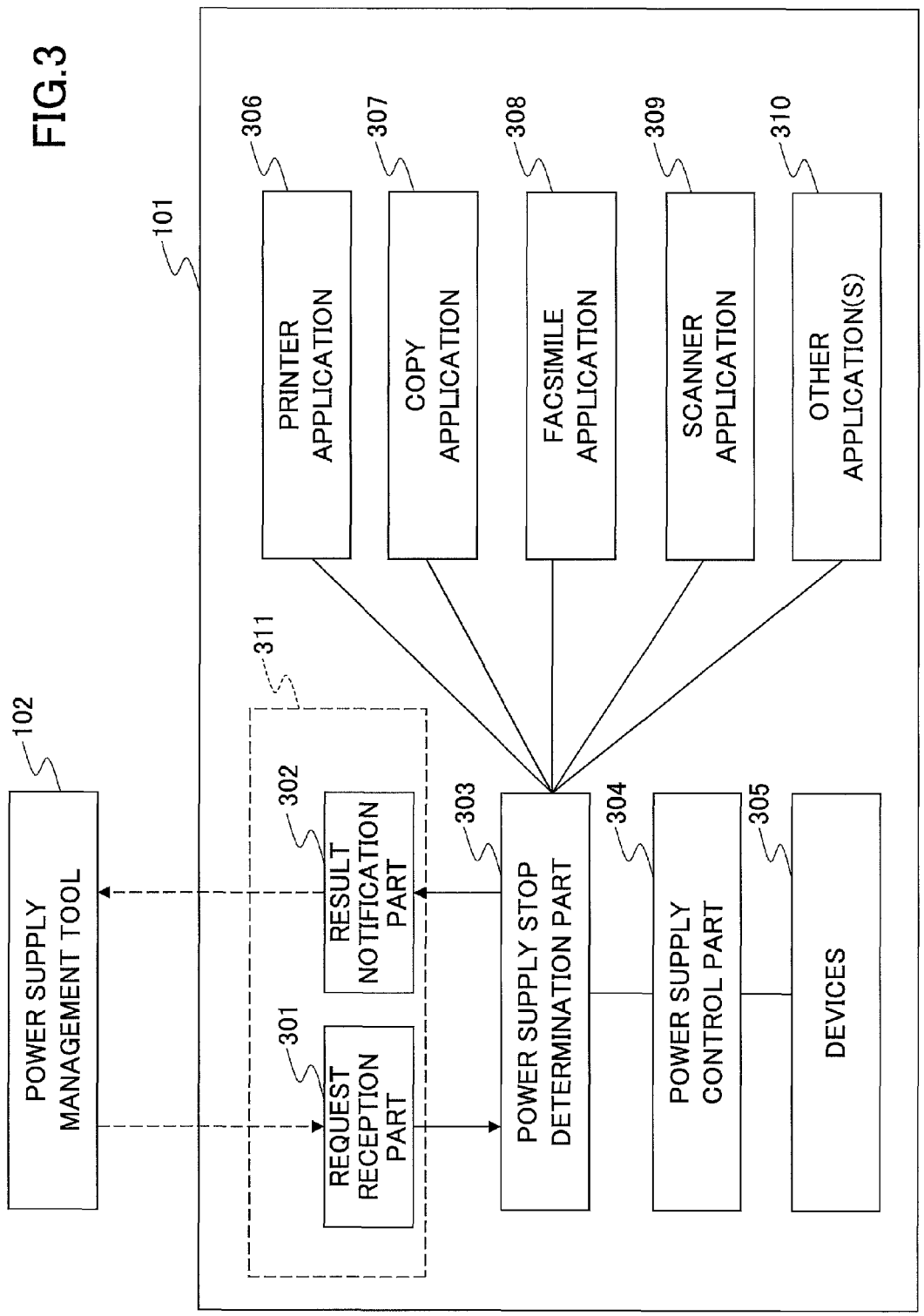
FIG. 3 shows a functional configuration of the image forming apparatus according to the first and second embodiments of the present invention.

FIG. 3 shows a functional configuration of the image forming apparatus 101 according to the first and second embodiments. The image forming apparatus 101 has a request reception part 301, a result notification part 302, a power supply stop determination part 303, a power supply control part 304, devices 305, a printer application 306, a copy application 307, a facsimile application 308, a scanner application 309 and another application(s) 310. Note that functions of the request reception part 301 and the result notification part 302 can be implemented by a single part such as a reception and notification part 311.

Further, at least some of the request reception part 301, the result notification part 302, the power supply stop determination part 303, the power supply control part 304, the printer application 306, the copy application 307, the facsimile application 308, the scanner application 309 and the other application(s) 310 are implemented by a program(s) executed by the CPU 201, for example.

The request reception part 301 receives a power supply stop request that requests to stop power supply in the image forming apparatus 101 from the power supply management tool 102 (request part) connected via the network 103. The image forming apparatus 101 has a plurality of power supply stop modes for stopping the power supply. The power supply stop request is a message that designates at least one of the plurality of power supply stop modes and requests the image forming apparatus 101 to stop the power supply.

The power supply stop determination part 303 (determination part) determines whether stopping the power supply in the image forming apparatus 101 is allowed in the plurality of power supply stop modes. The power supply stop determination part 303 queries the printer application 306, the copy application 307, the facsimile application 308, the scanner application 309 and the other application(s) 310 about their current operational states. Further, based on the thus obtained reports of the operational states from the respective applications, the power supply stop determination part 303 determines whether stopping the power supply in the image forming apparatus 101 is allowed.

Figure 4:
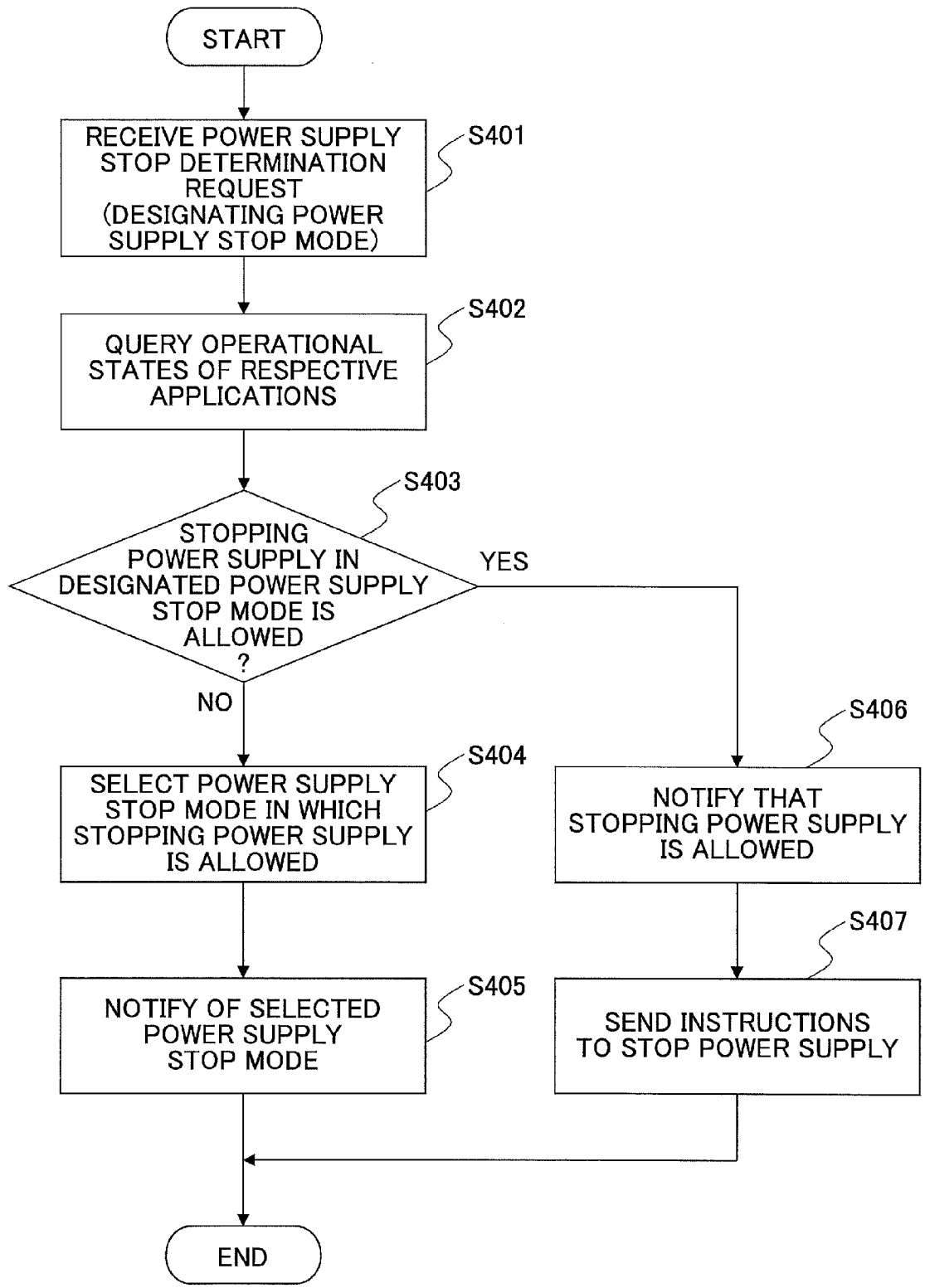
FIG. 4 is a flowchart showing one example of operations of a power supply stop determination part shown in FIG. 3.

FIG. 4 is a flowchart showing one example of the operations of the power supply stop determination part shown in FIG. 3. The power supply stop determination part 303 receives from the request reception part 301 or the like a power supply stop determination request that designates at least one power supply stop mode (step S401). In response thereto, the power supply stop determination part 303 queries the operational states of the respective applications (step S402). Next, the power supply stop determination part 303 reads the thus obtained reports of the operational states of the respective applications (step S402) and determines whether stopping the power supply in the image forming apparatus 101 is allowed (step S403).

When stopping the power supply in the image forming apparatus 101 is not allowed in the thus designated power supply stop mode, the power supply stop determination part 303 selects power supply stop modes in each of which stopping the power supply is allowed in the image forming apparatus 101 from among the plurality of power supply stop modes that the image forming apparatus 101 has (step S404). The power supply stop determination part 303 notifies the result notification part 302 and so forth of the thus selected power supply stop modes (step S405).

On the other hand, when, in step S403, stopping the power supply is allowed in the image forming apparatus 101 in the designated power supply stop mode, the power supply stop determination part 303 notifies the result notification part 302 and so forth that stopping the power supply is allowed (step S406), and sends an instruction to the power supply control part 304 and so forth to stop the power supply in the image forming apparatus 101 (step S407).

A specific method of determining whether stopping the power supply is allowed in the image forming apparatus 101 in a designated power supply stop mode will now be described. Table 1, below, shows one example of determination conditions for cases where stopping the power supply is not allowed in the image forming apparatus 101 in two power supply stop modes. Note that although description will now be made assuming that the plurality of power supply stop modes includes two power supply stop modes, the plurality of power supply stop modes can be three or more.

TABLE 1

| power supply stop mode | a case where stopping the power supply is not allowed |
|---|---|
| normal mode | a case where an application is currently being operated |
|  | a case where a predetermined time has not elapsed since a user made a recent operation |
|  | a case where a firmware update is currently being carried out |
|  | a case where the HDD is currently being encrypted |
| forced mode | a case where a firmware update is currently being carried out |
|  | a case where the HDD is currently being encrypted |

In this example, the image forming apparatus 101 has two power supply stop modes, a normal mode and a forced mode. The normal mode (first mode) is a mode for giving priority to the user's process before stopping the power supply. In this mode, the power supply is stopped when the image forming apparatus 101 is not in use. The forced mode (second mode) is a mode for giving priority to stopping the power supply before the user's process. In this mode, the process(es) under execution is(are) stopped as long as no damage is caused to the image forming apparatus 101 and the power supply is stopped.

As in the example of Table 1, the conditions for determining that stopping the power supply is not allowed differ depending on the required (designated) power supply stop mode. Therefore, it is possible that the power supply stop determination part 303 determines based on the current states of the respective applications whether stopping the power supply is allowed in each of the power supply stop modes. For example, when receiving a report from the other application(s) 310 indicating "HDD is currently being encrypted", it is possible to determine that stopping the power supply is not allowed in either the normal mode or the forced mode. Further, when receiving a report from the printer application 306 indicating that "during print operation" and reports from the remaining applications indicating that "no process is currently being carried out", it is possible to determine that stopping the power supply is allowed in the forced mode but not allowed in the normal mode since this is "a case where an application (the printer application 306) is currently being operated".

Returning to the description of FIG. 3, the description of the functional configuration of the image forming apparatus 101 will be continued. The power supply control part 304 controls (i.e., stops and starts) the power supply to the devices 305 in the image forming apparatus 101. The devices 305 are mounted in the image forming apparatus 101 and includes, for example, the HDD 208, the operation panel 209, the FCU 210, the printer 211, the scanner 212, shown in FIG. 2, and so forth.

The printer application 306 is an application for controlling printing processes. The copy application 307 is an application for controlling copying processes. The facsimile application 308 is an application for controlling facsimile transmission and reception processes and so forth. The scanner application 309 is an application for controlling processes of reading documents and so forth. The other application(s) 310 include, for example, applications for updating firmware, encrypting the HDD 208 and/or the like other than image processing. In response to being queried by the power supply stop determination part 303, the respective applications provide reports of the current states of their own processes, reserved processes, and/or the like, to the power supply stop determination part 303.

First Embodiment

Next, using FIGS. 5 and 6, operations in the power supply control system 100 according to the first embodiment of the present invention will be described.

Figure 5:
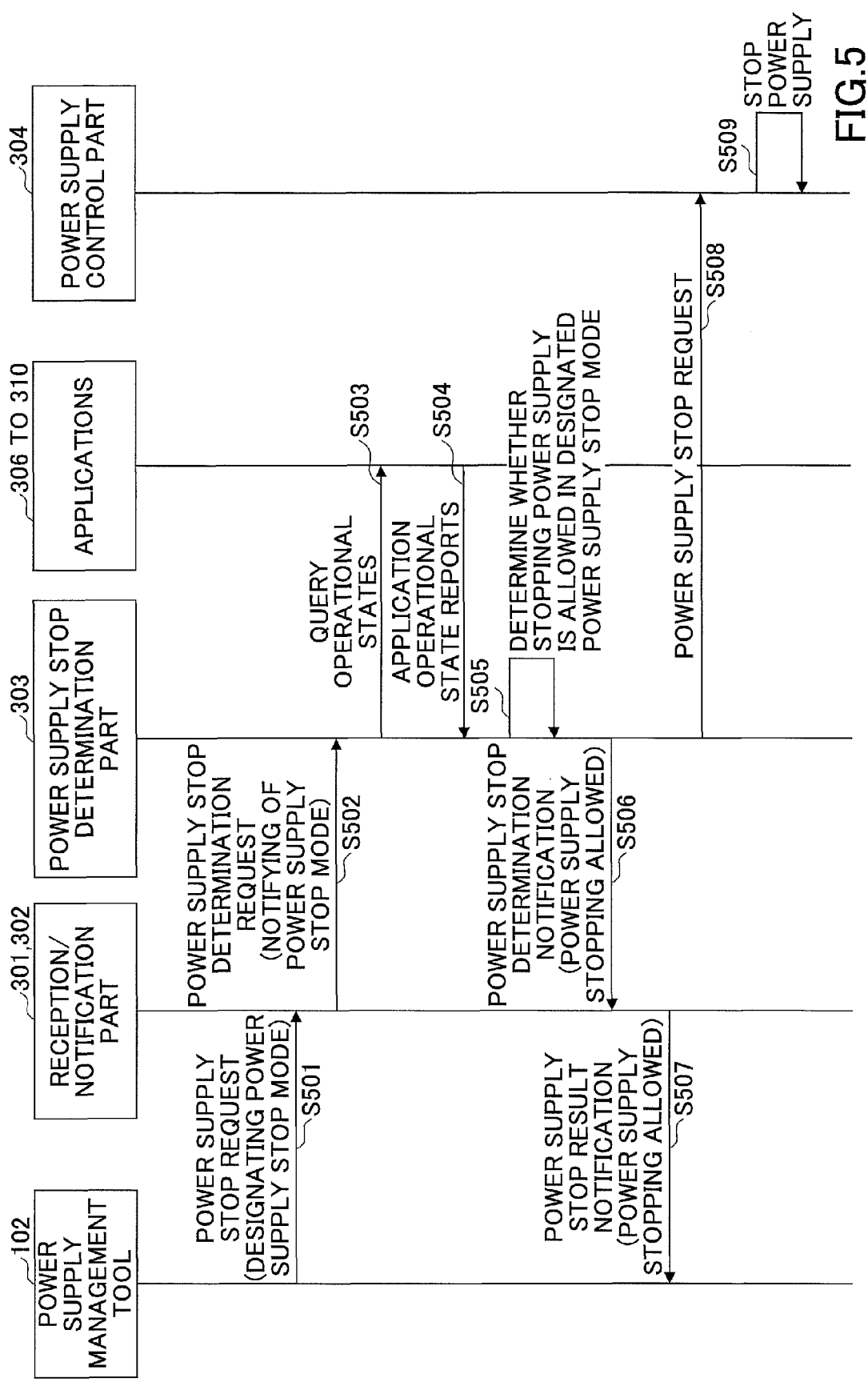
FIG. 5 is a sequence chart according to the first embodiment of the present invention for a case where stopping the power supply is allowed in a designated power supply stop mode.

FIG. 5 is a sequence chart according to the first embodiment for a case where stopping the power supply is allowed in the designated power supply stop mode(s). FIG. 6 is a sequence chart according to the first embodiment for a case where stopping the power supply is not allowed in the designated power supply stop mode(s). The user uses the power supply management tool 102 (request part), designates one or a plurality of power supply stop modes and sends a request for stopping the power supply to the image forming apparatus 101 (step S501). Note that when the plurality of power supply stop modes are designated, the power supply stop modes are designated thereamong while a priority order is given thereto.

In response to the request, the request reception part 301 transmits the power supply stop determination request including information of the one or the plurality of power supply stop modes to the power supply stop determination part 303 (step S502). When receiving the power supply stop determination request, the power supply stop determination part 303 queries the operational states of the respective applications (step S503). When receiving the queries concerning their operational states, the respective applications provide their current operational states and so forth to the power supply stop determination part 303 (step S504). When receiving the reports of the operational states from the respective applications, the power supply stop determination part 303 determines whether stopping the power supply is allowed in the designated one or plurality of power supply stop modes (S505).

When stopping the power supply is allowed in any one of the designated power supply stop modes, the power supply stop determination part 303 transmits a power supply stop determination notification having contents allowing stopping the power supply to the result notification part 302 (step S506). When receiving the power supply stop determination notification having the contents allowing stopping the power supply, the result notification part 302 transmits, to the power supply management tool 102, a power supply stop result notification having contents allowing stopping the power supply (step S507).

Further, the power supply stop determination part 303 selects the power supply stop mode having the highest priority order from among the power supply stop modes in each of which it is determined in step S505 that stopping the power supply is allowed and transmits a power supply stop request to the power supply control part 304 (step S508). When receiving the power supply stop request, the power supply control part 304 stops the power supply to the devices 305 (step S509).

Note that when the power supply control part 304 stops the power supply to the devices 305 in step S509, a specific method of stopping the power supply to the devices 305 can differ depending on the power supply stop mode selected by the power supply stop determination part 303 as mentioned above. For example, the forced mode of Table 1 can be classified into two forced modes each having a different way of stopping a process(es) under execution before actually stopping the power supply to the devices 305. For example, when the facsimile application 308 is in use, the facsimile application 308 is stopped immediately in a first one of the two forced modes and the facsimile application 308 is stopped after a currently executed facsimile job is finished in a second one of the two forced modes. When the two forced modes are those in each of which it is determined in step S505 that stopping the power supply is allowed and the above-mentioned second one of the two forced modes, for example, has the highest priority order therebetween, the second one of the two forced modes is selected and the facsimile application 308 is stopped after the currently executed facsimile job is finished and then the power supply to the devices 305 is stopped.

Through the above-mentioned operations, the power supply in the image forming apparatus 101 is stopped when stopping the power supply is allowed in at least any one of the power supply stop modes designated by the user.

Figure 6:
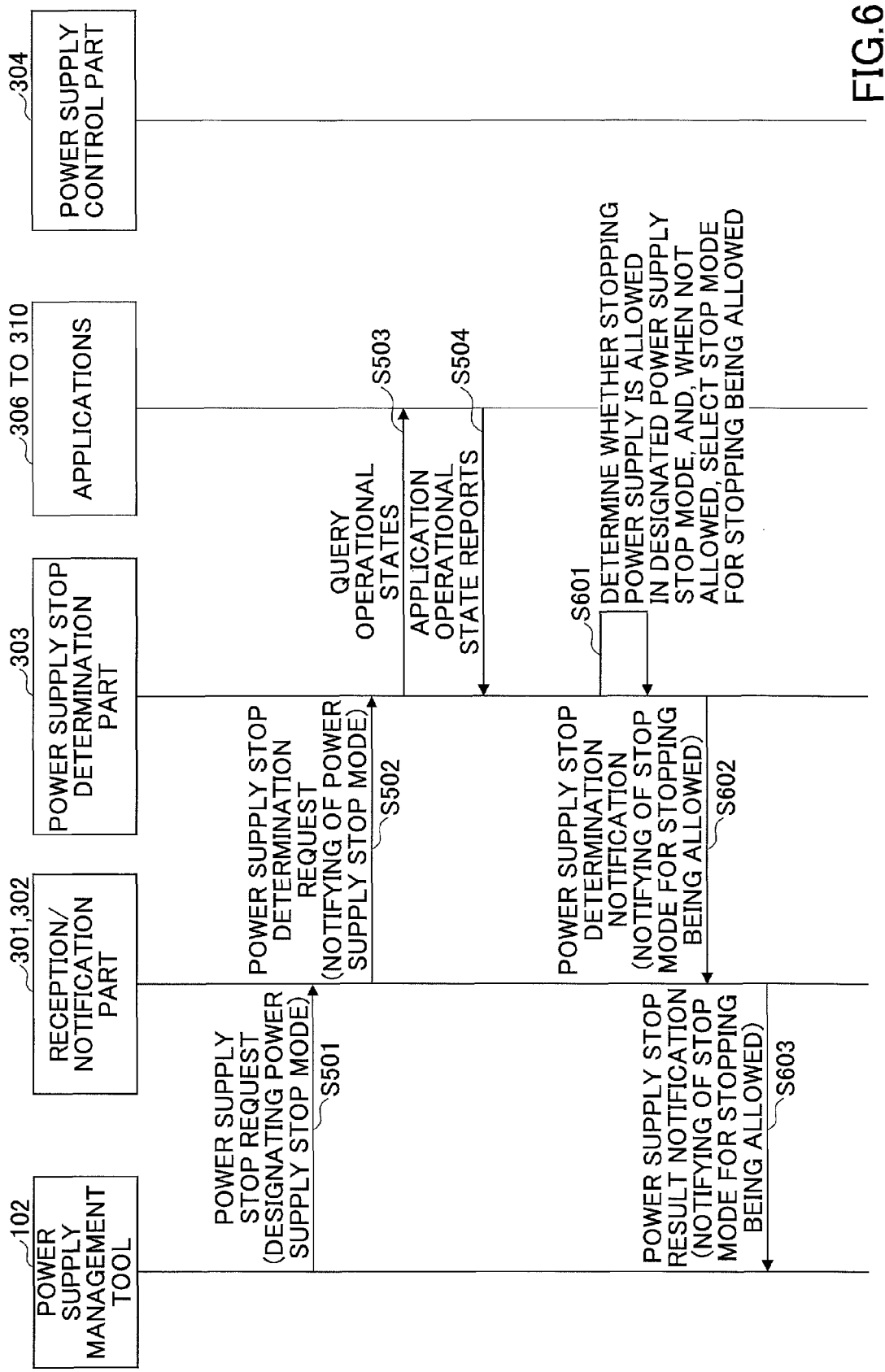
FIG. 6 is a sequence chart according to the first embodiment of the present invention for a case where stopping the power supply is not allowed in a designated power supply stop mode.

Next, FIG. 6 is a sequence chart according to the first embodiment for a case where stopping the power supply is not allowed in the designated power supply stop mode(s). The operations in steps S501 to S504 are the same as those in FIG. 5, and therefore, description will be made mainly for differences from FIG. 5. When determining that stopping the power supply in any one of the designated power supply stop mode(s) is not allowed, the power supply stop determination part 303 determines, for each of the plurality of power supply stop modes that the image forming apparatus 101 has, whether stopping the power supply is allowed in the power supply mode, for example. Thus, the power supply stop determination part 303 selects a power supply stop mode(s) in (each of) which stopping the power supply is allowed from among the plurality of power supply stop modes that the image forming apparatus 101 has (step S601). The power supply stop determination part 303 notifies the result notification part 302 of the thus selected power supply stop mode(s) in (each of) which stopping the power supply is allowed in the form of the power supply stop determination notification (step S602). When receiving the power supply stop determination notification of the power supply stop mode(s) in (each of) which stopping the power supply is allowed, the result notification part 302 transmits, to the power supply management tool 102, the power supply stop result notification indicating the power supply stop mode(s) in which stopping the power supply is allowed (step S603). Note that in steps S602 and S603, when there are no power supply stop modes in which stopping the power supply is allowed in step S601, the power supply stop determination notification and the power supply stop result notification indicating that there are no power supply stop modes in which stopping the power supply is allowed are transmitted instead.

Through the above-mentioned operations, when stopping the power supply is allowed in the image forming apparatus 101 in the designated power supply stop mode(s), the power supply stop mode(s) in (each of) which stopping the power supply is allowed is(are) sent to the power supply management tool 102 as notification. Further, when there are no power supply stop mode in which stopping the power supply is allowed, this matter is sent to the power supply management tool 102 as the power supply stop result notification.

When receiving the power supply stop result notification, the power supply management tool 102 displays the result of the power supply stop request obtained from the image forming apparatus 101 to the user. Table 2 shows one example of the display contents showing the result of the power supply stop request obtained from the image forming apparatus 101.

TABLE 2

| result of power supply stop request | display contents to the user |
|---|---|
| stopping power supply not allowed but allowed in forced mode | Not possible to turn off main power. Try again after a while or request to turn off main power with forced mode. |
| stopping power supply not allowed and also not allowed even in forced mode | Not possible to turn off main power. Check apparatus and request to turn off main power. |

According to the display contents of Table 2, the user can determine what to do next. For example, the user determines to send a power supply stop request again after a while, send a power supply stop request again after changing the power supply stop mode, not send a power supply stop request again, or the like.

Thus, according to the first embodiment, a user can use the power supply management tool 102, designate one or a plurality of power supply stop modes from among a plurality of power supply stop modes that the image forming apparatus 101 has and send a request to the image forming apparatus 101 to stop the power supply. Thus, the user can select a preferable method of stopping the power supply (i.e., designate a preferable power supply stop mode) according to the user's request and a request to stop the power supply in the image forming apparatus 101 remotely. Further, when it is not possible to stop the power supply in the designated power supply modes, a power supply mode(s) in which stopping the power supply is allowed is(are) provided to the user from among the plurality of power supply modes that the image forming apparatus 101 has, and thus, the user can appropriately deal with the situation.

Second Embodiment

Next, using FIG. 7, operations in the power supply control system 100 according to the second embodiment of the present invention will be described. According to the second embodiment, the power supply management tool 102 automatically sends a power supply stop request again depending on a power supply stop result notification received from the image forming apparatus 101.

Figure 7:
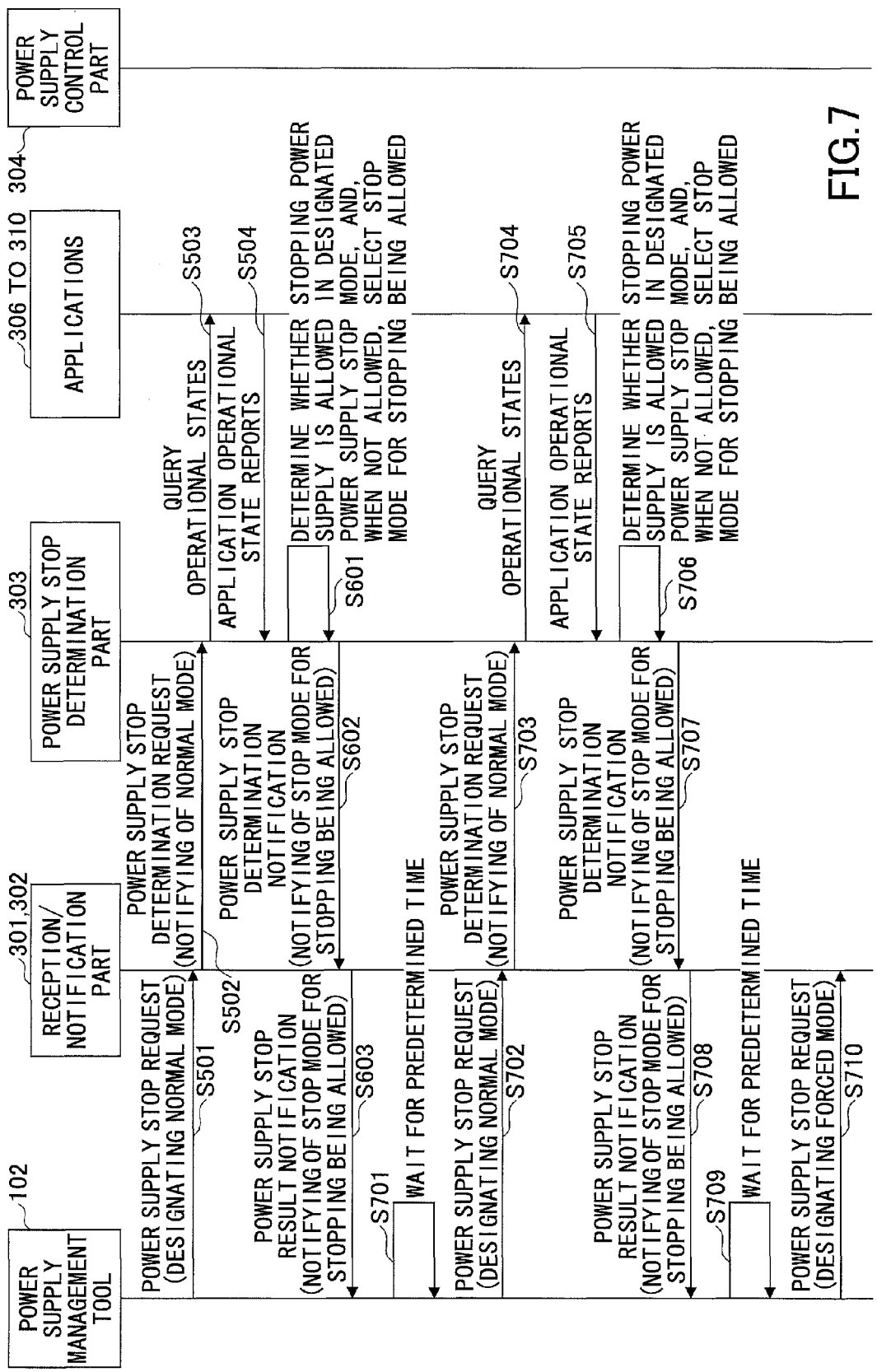
FIG. 7 is a sequence chart according to the second embodiment of the present invention.

FIG. 7 is a sequence chart according to the second embodiment. The operations in steps S501 to S603 are the same as those in FIG. 6, and therefore, description will be made mainly for differences from FIG. 6. In step S603, when receiving a power supply stop result notification, the power supply management tool 102 waits for a predetermined period of time (for example, 15 minutes) (step S701) and transmits a power supply stop request again (retrying) (step S702). At this time, the power supply management tool 102 transmits the power supply stop request designating the same power supply stop mode as a power supply stop mode in which stopping the power supply is not allowed in step S601 or a power supply stop mode that has a forced degree higher than a power supply stop mode in which stopping the power supply is not allowed in step S601. In the example of FIG. 7, in step S501, the power supply stop request is transmitted designating the normal mode in Table 1. Therefore, a power supply stop request is transmitted again in step S702 designating either the normal mode that is the same power supply stop mode as the previous time or the forced mode that has a higher forced degree than the normal mode. In the example of FIG. 7, in step S702, the power supply management tool 102 designates the same power supply stop mode (normal mode) as the previous time and carries out retrying in step S702.

In steps S702 to S708, when a power supply stop result notification indicating that stopping the power supply is not allowed is received again, the power supply management tool 102 designates the forced mode having a higher forced degree than the normal mode designated in the previous time in step S702, and again transmits a power supply stop request in step S710, after waiting for a predetermined period of time in step S709.

Note that such retrying is not carried out in step S702 or S710 when a power supply stop result notification given in step S603 or S708 indicates that there are no power supply stop mode in which stopping the power supply is allowed.

Further, it is more preferable that the power supply management tool 102 again transmits a power supply stop request (retrying) designating the power supply stop mode in which stopping the power supply is allowed indicated by the power supply stop result notification. Further, when the power supply management tool 102 receives the power supply stop result notification indicating a plurality of power supply modes in each of which stopping the power supply is allowed, the power supply management tool 102 can select an optimum one from among the plurality of power supply stop modes indicated by the power supply stop result notification and carry out retrying. Note that the above-mentioned optimum one from among the plurality of power supply stop modes indicated by the power supply stop result notification can be, for example, the power supply stop mode having the lowest forced degree thereamong.

Through the above-mentioned operations, even when it is not possible to stop power supply in a timing in which a user requests to stop the power supply, a power supply stop request is automatically transmitted again. Thus, it is possible to automatically stop the power supply in the image forming apparatus 101.

Thus, the image forming apparatuses and the power supply control systems have been described in the embodiments. However, the present invention is not limited to the specifically disclosed embodiments and variations and modifications may be made without departing from the scope of the present invention.

The present application is based on and claims the benefit of priority of Japanese Priority Application No. 2013-081085, dated Apr. 9, 2013, the entire contents of which are hereby incorporated herein by reference.

What is claimed is:

1. An image forming apparatus comprising:
a processor configured to receive a request to power down the image forming apparatus, wherein the request includes an identification of at least one mode of a plurality of modes for powering down the image forming apparatus, wherein each of the plurality of modes is associated with at least one activity that is executable by the image forming apparatus,
the processor configured to identify executing activities in the image forming apparatus in response to receiving the request, to determine that the at least one activity associated with the mode of the request matches one of the executing activities, and to prevent power down of the image forming apparatus by rejecting the request in response to the determination;
the processor configured to, in response to rejecting the request, identify another mode that is associated with at least one different activity than the mode identified in the request, wherein the at least one different activity does not match the executing activities, and to notify the information processing apparatus of the other mode.

2. A power supply control system comprising:
an information processing apparatus configured to transmit, to an image forming apparatus connected via a network, a request to power down the image forming apparatus, wherein the request includes an identification of at least one mode of a plurality of modes for powering down the image forming apparatus, and wherein each of the plurality of modes is associated with at least one activity that is executable by the image forming apparatus;
a processor configured to identify executing activities in the image forming apparatus in response to receiving the request, to determine that the at least one activity associated with the mode of the request matches one of the executing activities, and to prevent power down of the image forming apparatus by rejecting the request in response to the determination;
the processor configured to, in response to rejecting the request, identify another mode that is associated with at least one different activity than the mode identified in the request, wherein the at least one different activity does not match the executing activities, and to notify the information processing apparatus of the other mode.

3. The power supply control system as claimed in claim 2, wherein the information processing apparatus is configured to display the other mode.

4. The power supply control system as claimed in claim 2, wherein
the information processing apparatus is configured to automatically transmit the other mode to the image forming apparatus in response to the notification.

5. The power supply control system as claimed in claim 2, wherein
the plurality of modes comprise at least a first mode and a second mode;
the first mode is associated with activities that are frequently executed in the image forming apparatus;
the second mode is associated with activities that are infrequently executed in the image forming apparatus; and
the processor configured to prioritize powering down the image forming apparatus when the second mode is identified in the request in comparison to when the first mode is identified in the request.

6. The power supply control system as claimed in claim 2, wherein
the mode of the request is associated with activities defined by: a state as to whether an application is being operated in the image forming apparatus, a state as to whether a predetermined time has not elapsed since a user made a recent operation in the image forming apparatus, a state as to whether an operation of updating firmware is being carried out in the image forming apparatus, and a state as to whether information stored in a storage is being encrypted in the image forming apparatus; and
another mode other than the mode of the request is associated with activities defined by: a state as to whether updating the firmware is being carried out in the image forming apparatus, and a state where information stored in a storage is being encrypted in the image forming apparatus.

7. The power supply control system as claimed in claim 2, wherein
each of the plurality of modes is assigned a priority relative to one another;
the processor configured to, in response to rejecting the request, notify the information processing apparatus of the priority of the other mode.

8. The power supply control system as claimed in claim 2, wherein
each mode is different by one or more activities.

* * * * *